(12) United States Patent
Eck et al.

(10) Patent No.: US 7,665,446 B2
(45) Date of Patent: Feb. 23, 2010

(54) FEED UNIT

(75) Inventors: Karl Eck, Frankfurt (DE); Dieter Hagist, Lahnstein (DE); Matthias Kadler, Gross-Gerau (DE); Martin Maasz, Sulzbach (DE); Oliver Schönert, Arnsberg (DE); Michael Teichert, Schwalbach (DE)

(73) Assignee: Continental Automotive GmbH, Hannover (DE)

( * ) Notice: Subject to any disclaimer, the term of this patent is extended or adjusted under 35 U.S.C. 154(b) by 12 days.

(21) Appl. No.: 12/162,045

(22) PCT Filed: Jan. 12, 2007

(86) PCT No.: PCT/EP2007/050283

§ 371 (c)(1),
(2), (4) Date: Jul. 24, 2008

(87) PCT Pub. No.: WO2007/085536

PCT Pub. Date: Aug. 2, 2007

(65) Prior Publication Data

US 2009/0013971 A1    Jan. 15, 2009

(30) Foreign Application Priority Data

Jan. 24, 2006   (DE) ...................... 10 2006 003 420

(51) Int. Cl.
*F02M 37/04* (2006.01)
*B01D 47/02* (2006.01)
*F04F 5/00* (2006.01)

(52) U.S. Cl. .................. 123/509; 417/151; 137/565.22
(58) Field of Classification Search ................ 123/497, 123/509; 417/151, 76, 83, 198, 199.1; 137/565.22, 137/565.35, 574, 576
See application file for complete search history.

(56) References Cited

U.S. PATENT DOCUMENTS

| | | | | |
|---|---|---|---|---|
| 5,392,750 | A * | 2/1995 | Laue et al. .................. 123/509 |
| 5,452,701 | A * | 9/1995 | Tuckey ....................... 123/509 |
| 6,123,511 | A * | 9/2000 | Sertier ......................... 417/87 |
| 6,155,793 | A * | 12/2000 | Tuckey et al. ................. 417/87 |
| 6,273,131 | B1 | 8/2001 | Kleppner ............... 137/565.22 |
| 6,305,417 | B1 * | 10/2001 | Kleppner et al. ....... 137/565.34 |
| 6,425,378 | B1 * | 7/2002 | Frank .......................... 123/514 |
| 6,457,945 | B2 | 10/2002 | Kleppner et al. ............. 417/84 |
| 6,488,476 | B2 * | 12/2002 | Eck .............................. 417/76 |
| 6,505,644 | B2 * | 1/2003 | Coha et al. ............. 137/565.22 |

(Continued)

FOREIGN PATENT DOCUMENTS

DE    195 49 192 A1    7/1997

(Continued)

*Primary Examiner*—Thomas N Moulis
(74) *Attorney, Agent, or Firm*—King & Spalding L.L.P.

(57) ABSTRACT

In a feed unit for feeding fuel from a fuel container of a motor vehicle a surge part (1) has a base plate (9) and an adjoining tubular section (10). The base plate (9) is fabricated in one piece with a nozzle (15) and a mixer pipe (16) of a suction jet pump (8) and has receptacles (21, 13) for a fine filter (3) and for supporting rods (22) of a fuel pump (2). The feed unit is of particularly simple design as a result of this and can be fabricated in a cost-effective way.

20 Claims, 4 Drawing Sheets

U.S. PATENT DOCUMENTS

| | | | |
|---|---|---|---|
| 6,619,271 B2 * | 9/2003 | Iwamoto et al. | 123/509 |
| 6,619,272 B2 * | 9/2003 | Jones et al. | 123/514 |
| 6,705,298 B2 * | 3/2004 | Ramamurthy et al. | 123/509 |
| 6,832,627 B2 * | 12/2004 | Braun et al. | 137/565.22 |
| 6,923,208 B2 * | 8/2005 | Okabe et al. | 137/565.22 |
| 7,007,678 B2 * | 3/2006 | Schultz et al. | 123/509 |
| 7,117,856 B2 * | 10/2006 | Honda et al. | 123/514 |
| 2001/0055530 A1 | 12/2001 | Eck | 417/87 |
| 2002/0172601 A1 | 11/2002 | Lienig | 417/198 |
| 2004/0161342 A1 * | 8/2004 | Herbers et al. | 417/151 |
| 2005/0045159 A1 * | 3/2005 | Honda et al. | 123/509 |
| 2009/0035153 A1 * | 2/2009 | Briggs et al. | 417/87 |

FOREIGN PATENT DOCUMENTS

| | | |
|---|---|---|
| DE | 199 32 684 A1 | 7/1999 |
| DE | 198 30 504 A1 | 1/2000 |
| DE | 199 61 923 A1 | 7/2001 |
| DE | 10 2005 047 546 B3 | 2/2007 |
| EP | 0 959 242 A1 | 11/1999 |
| WO | WO 02/086323 A2 | 10/2002 |

* cited by examiner

FEED UNIT

CROSS-REFERENCE TO RELATED APPLICATIONS

This application is a U.S. national stage application of International Application No. PCT/EP2007/050283 filed Jan. 12, 2007, which designates the United States of America, and claims priority to German application number 10 2006 003 420.1 filed Jan. 24, 2006, the contents of which are hereby incorporated by reference in their entirety.

TECHNICAL FIELD

The invention relates to a feed unit for conveying fuel out of a fuel tank of a motor vehicle, with a fuel pump arranged in a baffle, with a tubular portion of the baffle, said tubular portion at least partially receiving the fuel pump, with a baseplate of the baffle, said baseplate closing off the tubular portion downward, and with a suction jet pump provided for filling the baffle with fuel from the fuel tank.

BACKGROUND

Such feed units are often used in present-day motor vehicles and are known from practice. In these feed units, in particular, the suction jet pump and further components arranged in the baffle are mounted individually. This leads to a high outlay in terms of the assembly of the known feed unit and consequently to high manufacturing costs. Furthermore, in particular, the suction jet pump is a component which is complicated to manufacture and the individual parts of which have to be oriented reliably with respect to one another. A two-part configuration of the suction jet pump therefore likewise leads to a complicated assembly and high manufacturing costs of the known feed unit.

SUMMARY

A feed unit of the type initially mentioned can be developed such that it is constructed in a particularly simple way and is cost-effective to manufacture. According to an embodiment, a feed unit for conveying fuel out of a fuel tank of a motor vehicle, may comprise a fuel pump arranged in a baffle, a tubular portion of the baffle, said tubular portion at least partially receiving the fuel pump, a baseplate of the baffle, said baseplate closing off the tubular portion downward, and a suction jet pump provided for filling the baffle with fuel from the fuel tank, wherein the components of the suction jet pump are manufactured in one piece with the baseplate of the baffle, the baseplate and the tubular portion are designed as components to be manufactured independently of one another, and wherein the baseplate has a margin connected sealingly to the tubular portion of the baffle. According to a further embodiment, a set-up supporting margin of the baseplate may support the margin of the tubular portion.

According to a further embodiment, a nozzle of the suction jet pump may have a duct led as far as the supporting margin of the baseplate, the duct being closed at its end facing away from the nozzle, and a propellant connection which faces the tubular portion may be arranged between the nozzle and that end of said duct which faces away from the nozzle. According to a further embodiment, the baseplate and the tubular portion may delimit a chamber arranged between the nozzle and a mixing tube, adjoining the nozzle, of the suction jet pump, and a bottom valve may be arranged in the baseplate and issues into the chamber. According to a further embodiment, the mixing tube may issue into a second chamber, and the second chamber may be connected to the remaining regions of the baffle via an overflow. According to a further embodiment, the chamber may be led radially outward to the tubular portion by two walls of the baseplate which lie one above the other in parallel. According to a further embodiment, a receptacle for a pump holder may have a sleeve-shaped configuration and faces the tubular portion. According to a further embodiment, the propellant connection and/or the receptacle for the pump holder may project/projects vertically from the baseplate. According to a further embodiment, the tubular portion may have a supporting wall arranged parallel to the plane of the baseplate. According to a further embodiment, the supporting wall may have means for holding the fuel pump and/or a fine filter. According to a further embodiment, the pump holder may have a plurality of supporting bars projecting from the supporting wall. According to a further embodiment, the supporting wall may have a connection piece for the propellant connection. According to a further embodiment, the baseplate may have a receptacle for the fine filter. According to a further embodiment, the baseplate may have a first-filling orifice with a nonreturn valve and, upstream of the first-filling orifice, a depression, and a suction connection piece of the fuel pump may be led into the depression. According to a further embodiment, the tubular portion and the baseplate may be connected to one another via a press fit. According to a further embodiment, the baseplate can be welded to the tubular portion.

BRIEF DESCRIPTION OF THE DRAWINGS

The invention permits numerous embodiments. To make its basic principle even clearer, one of these is illustrated in the drawing and is described below. In the drawing.

DETAILED DESCRIPTION

Figure 1:
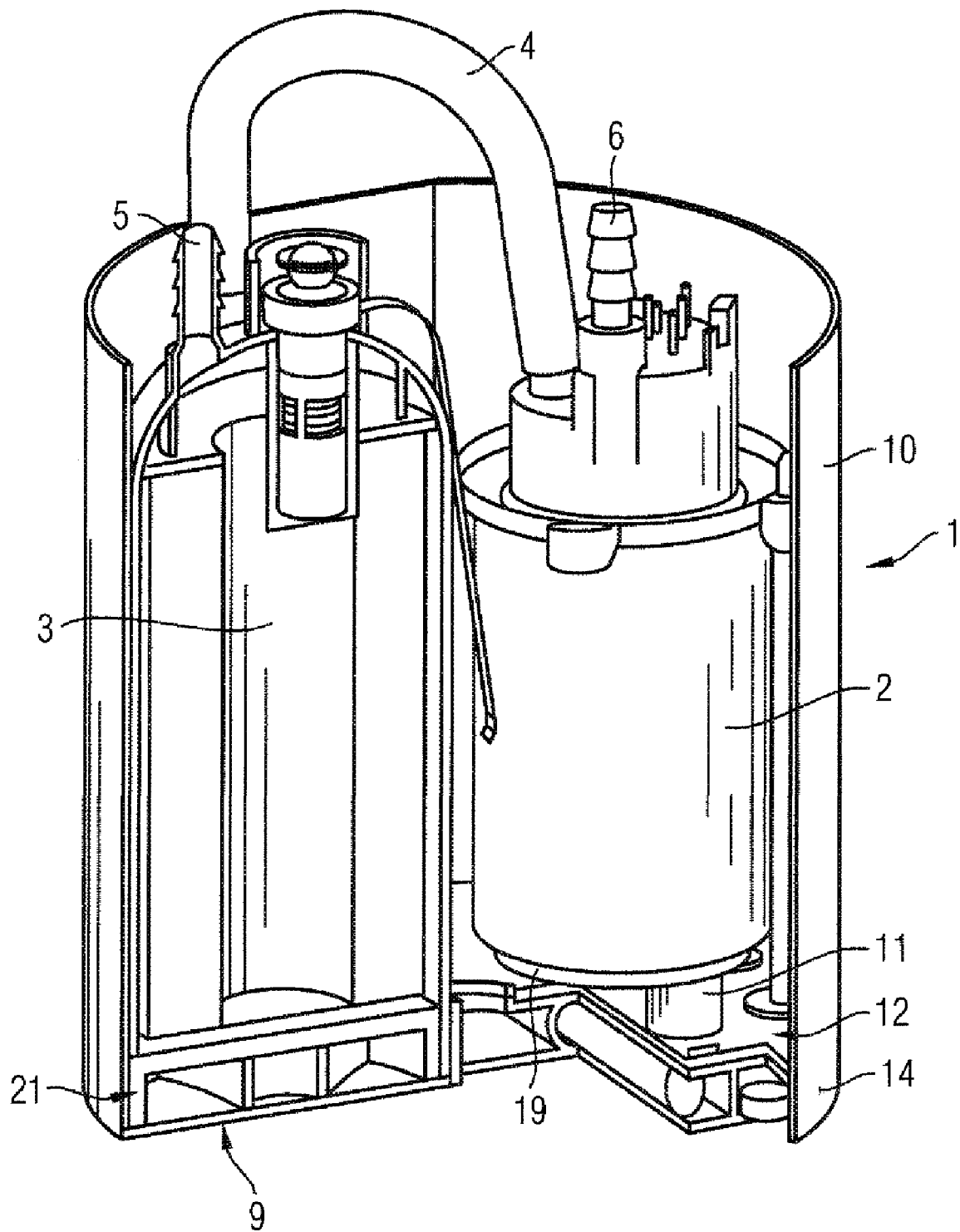
FIG. 1 shows a part section through a feed unit according to an embodiment.

According to various embodiments, the components of the suction jet pump may be manufactured in one piece with the baseplate of the baffle, the baseplate and the tubular portion may be designed as components to be manufactured independently of one another, and the baseplate may have a margin connected sealingly to the tubular portion of the baffle.

By the suction jet pump being manufactured in one piece with the baseplate, the individual components of the suction jet pump are reliably oriented with respect to one another. Moreover, the mounting of the suction jet pump in the baffle is therefore dispensed with. Furthermore, the two-part configuration of the baffle leads to a structurally simple set-up of the tubular portion and of the baseplate. The baseplate and the tubular portion can therefore be manufactured particularly cost-effectively from plastic by the injection molding method. The margin of the tubular portion makes it possible to seal off with respect to the baseplate in a particularly simple way. As a result, the feed unit according to an embodiment is constructed particularly simply and can be manufactured cost-effectively.

According to an embodiment, it may contribute to increasing the stability of the baffle if a set-up supporting margin of the baseplate supports the margin of the tubular portion.

According to an embodiment, the supply of the suction jet pump with fuel as propellant can be particularly simple if a nozzle of the suction jet pump has a duct led as far as the supporting margin of the baseplate, if the duct is closed at its end facing away from the nozzle, and if a propellant connection which faces the tubular portion is arranged between the nozzle and that end of said duct which faces away from the nozzle.

It may contribute to reducing the number of components of the feed unit according to an embodiment if the baseplate and the tubular portion delimit a chamber arranged between the nozzle and a mixing tube, adjoining the nozzle, of the suction jet pump, and if a bottom valve is arranged in the baseplate and issues into the chamber. Such bottom valves close the orifice when the pressure upstream of the mixing tube of the suction jet pump is higher than it is in the fuel tank. Otherwise, the orifice is released and fuel can be sucked in through the suction jet pump. According to another embodiment, the outlay for routing into the baffle, with as little turbulence as possible, the fuel which is conveyed by the suction jet pump can be kept particularly low if the mixing tube issues into a second chamber, and if the second chamber is connected to the remaining regions of the baffle via an overflow.

According to another embodiment, the number of sealing points and of components of the baffle can be kept particularly low if the chamber is led radially outward to the tubular portion by two walls of the baseplate which lie one above the other in parallel.

According to another embodiment, the fastening of the fuel pump in the baffle can be particularly simple if a receptacle for a pump holder has a sleeve-shaped configuration and faces the tubular portion.

It may contribute to a further simplification of the manufacture of the feed unit according to an embodiment if the propellant connection and/or the receptacle for the pump holder project/projects vertically from the baseplate. As a result, the propellant connection and/or the receptacle for the pump holder can be manufactured in an axially-removable injection mold of the baseplate.

The feed unit according to an embodiment may make it possible to delimit a plurality of chambers in a simple way and has high stability if the tubular portion has a supporting wall arranged parallel to the plane of the baseplate.

According to another embodiment, it may contribute to a further simplification of the fastening of components to be arranged in the baffle if the supporting wall has means for holding the fuel pump and/or a fine filter.

According to another embodiment, it may contribute to a further simplification of the fastening of the fuel pump in the baffle if the pump holder has a plurality of supporting bars projecting from the supporting wall.

It may contribute to a further simplification of the mounting of the feed unit according to an embodiment if the supporting wall has a connection piece for the propellant connection.

It may contribute to a further simplification of the construction of the feed unit according to an embodiment if the baseplate has a receptacle for the fine filter.

Operation of the feed pump according to an embodiment can be ensured reliably, even in the case of a very low filling level of fuel in the fuel tank, if the baseplate has a first-filling orifice with a nonreturn valve and, upstream of the first-filling orifice, a depression, and if a suction connection piece of the fuel pump is led into the depression.

According to another embodiment, an intended leaktightness of the chamber delimited by the baseplate and the tubular portion can be achieved in a simple way if the tubular portion and the baseplate are connected to one another via a press fit. By virtue of this configuration, the plastic of the baseplate and of the tubular portion will swell slightly upon contact with fuel and consequently generate the intended leaktightness.

The feed unit according to an embodiment may have particularly high stability if the baseplate is welded to the tubular portion. Welding may in this case take place in a simple way at edges of the tubular portion and of the baseplate which are accessible from outside the baffle and which are contiguous to one another.

Figure 2:
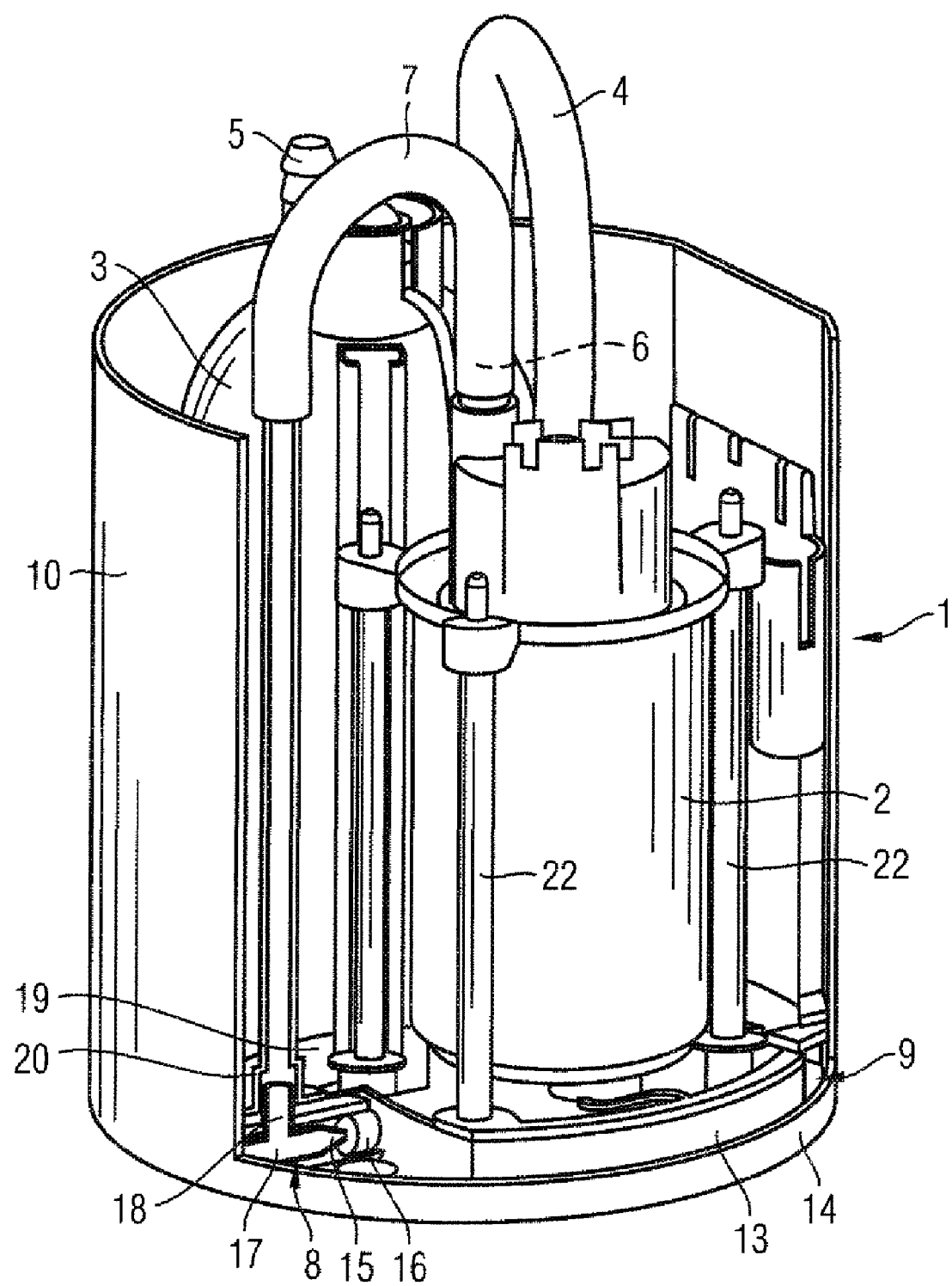
FIG. 2 shows a second part section, offset with respect to the part section from FIG. 1, of the feed unit according to an embodiment.

FIG. 1 shows a feed unit for conveying fuel out of a fuel tank to an internal combustion engine of a motor vehicle. The feed unit has an electromotively driven fuel pump 2 arranged in a baffle 1 and a fine filter 3. The fine filter 3 is likewise arranged in the baffle 1 and is connected to the fuel pump 2 via a fuel line 4. Furthermore, the fine filter 3 has a connection piece 5 for a forward-flow line, not illustrated, leading to the internal combustion engine. A line 7, illustrated in FIG. 2, for a suction jet pump 8, likewise illustrated in FIG. 2, is connected to a connection 6 of the fuel pump 2. The baffle 1 serves for collecting fuel and has a baseplate 9 and a tubular portion 10 connected sealingly to the baseplate 9. A suction connection piece 11 of the fuel pump 2 projects into a depression 12 of the baseplate 9. The fuel pump 2 can consequently suck in fuel from the baffle 1 and convey it via the fine filter 3 to the connection piece 5 for the forward-flow line.

The tubular portion 10 of the baffle 1 has a margin 14 engaging over a supporting margin 13 of the baseplate 9. The margin 14 and the supporting margin 13 are sealingly connected to one another. As shown in FIGS. 1 and 2, a nozzle 15 and a mixing tube 16 of the suction jet pump 8 are manufactured in one piece with the baseplate 9. The nozzle 15 has a duct 17 led as far as the supporting margin 13. The duct 17 has a propellant connection 18, manufactured in one piece with the baseplate 9, for the suction jet pump 8. A supporting wall 19 of the tubular portion 10 extends parallel to the plane of the baseplate 9 and has a connection piece 20 for the propellant connection 18. The fuel line 7 leads from the connection piece 20 for the propellant connection 18 to the connection 6 of the fuel pump 2. The fine filter 3 is fastened in a receptacle 21 of the baseplate 9. Vertically led supporting bars 22 for holding the fuel pump 2 project from the supporting wall 19.

Figure 3:
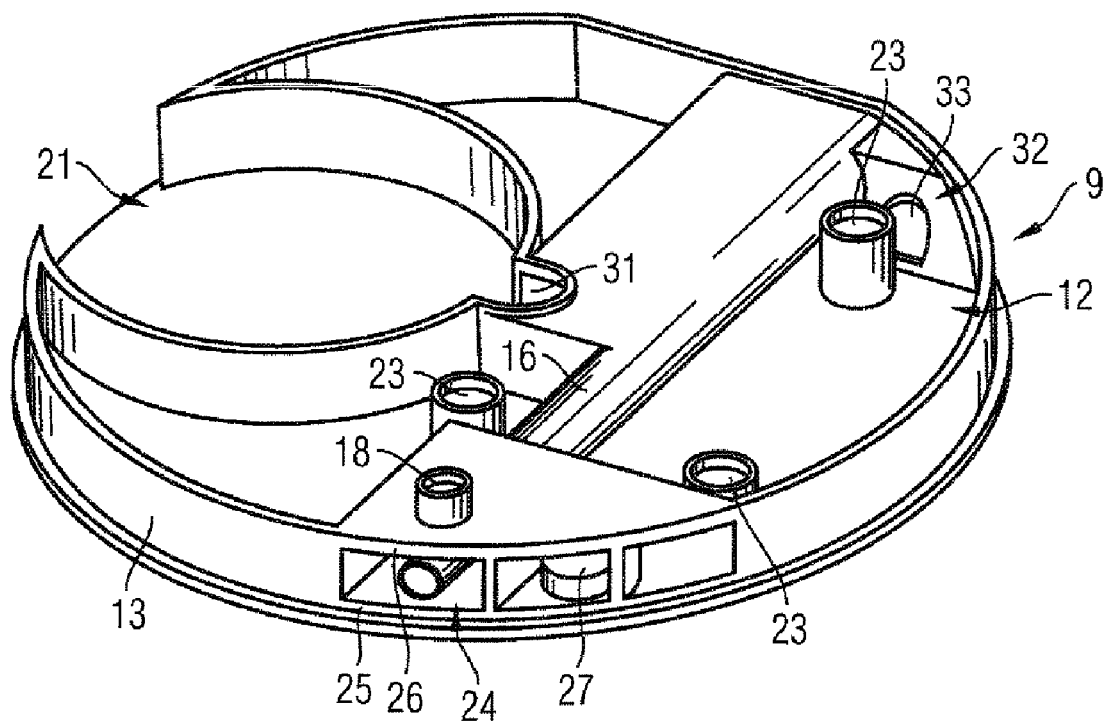
FIG. 3 shows a perspective illustration of a baseplate of the feed unit from FIG. 1.
Figure 4:
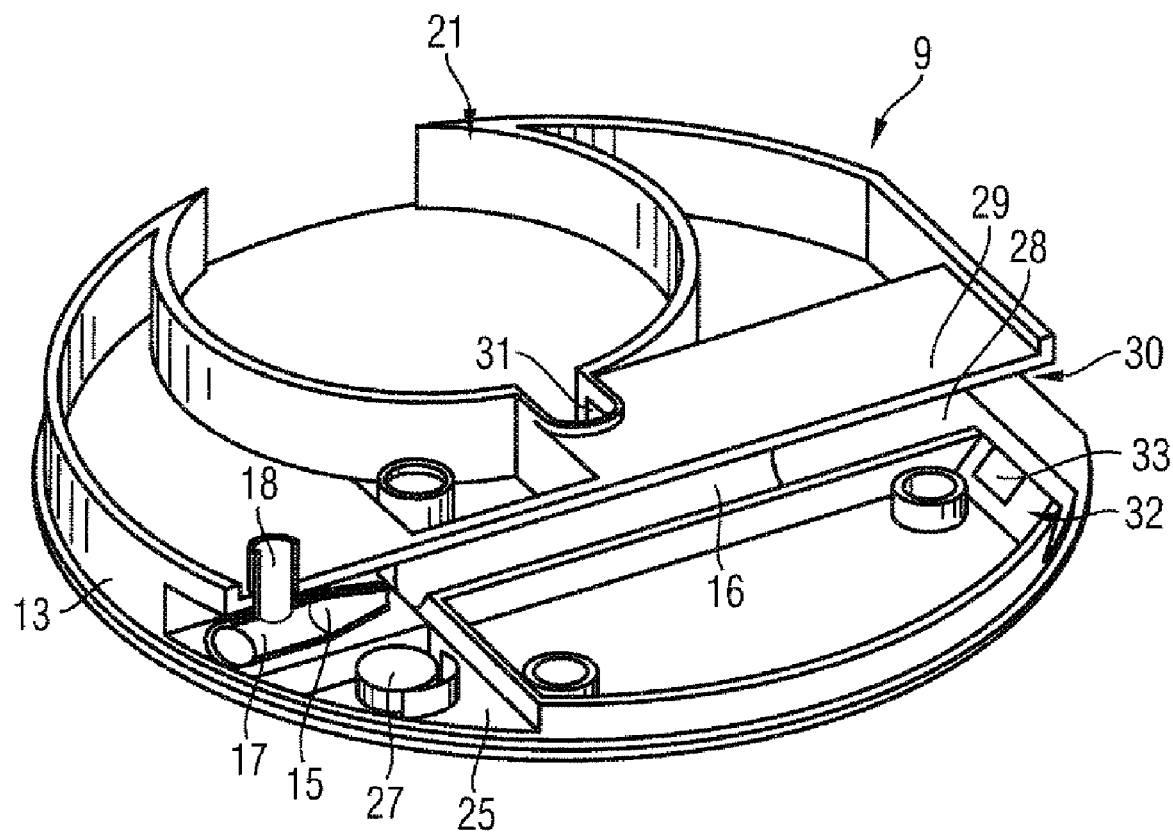
FIG. 4 shows a further perspective illustration of the baseplate from FIG. 3 in part section.

As FIG. 3 shows in a perspective and enlarged illustration of the baseplate 9, sleeve-shaped receptacles 23 are manufactured in one piece with the baseplate 9. The supporting bars 22 illustrated in FIG. 2 are plugged into the sleeve-shaped receptacles 23. The baseplate 9 has two parallel walls 25, 26 delimiting a chamber 24. The chamber 24 has a bottom valve 27 for sucking in fuel from the surroundings of the baffle 1 by means of the suction jet pump 8. The components of the suction jet pump 8 which are located in the chamber 24 can be seen in a part section illustrated in FIG. 4. In the mounted state of the feed unit, the chamber 24 is delimited by the margin 14 of the tubular portion 10 of the baffle 1. Moreover, FIG. 4 shows that the mixing tube 16 issues into a second chamber 30 likewise delimited by walls 28, 29 of the baseplate 9. The fuel sucked in by the suction jet pump 8 via the bottom valve 27 passes via an overflow 31 of the second chamber 30 into the baffle 1. The second chamber 30, too, is sealed off by the margin 14 of the tubular portion 10 of the baffle 1. A first-filling orifice 32 with a nonreturn valve 33 issues into the depression 12 of the baseplate 9.

The invention claimed is:

1. A feed unit for conveying fuel out of a fuel tank of a motor vehicle, comprising:
   a fuel pump arranged in a baffle,
   a tubular portion of the baffle, said tubular portion at least partially receiving the fuel pump,
   a baseplate of the baffle, said baseplate closing off the tubular portion downward, and
   a suction jet pump provided for filling the baffle with fuel from the fuel tank, wherein the components of the suction jet pump are manufactured in one piece with the baseplate of the baffle, the baseplate and the tubular portion are designed as components to be manufactured independently of one another, and wherein the baseplate has a margin connected sealingly to the tubular portion of the baffle.

2. The feed unit according to claim 1, wherein a set-up supporting margin of the baseplate supports the margin of the tubular portion.

3. The feed unit according to claim 1, wherein a, nozzle of the suction jet pump has a duct led as far as the supporting margin of the baseplate, the duct being closed at its end facing away from the nozzle, and wherein a propellant connection which faces the tubular portion is arranged between the nozzle and that end of said duct which faces away from the nozzle.

4. The feed unit according to claim 1, wherein the baseplate and the tubular portion delimit a chamber arranged between the nozzle and a mixing tube, adjoining the nozzle, of the suction jet pump, and wherein bottom a valve is arranged in the baseplate and issues into the chamber.

5. The feed unit according to claim 1, wherein the mixing tube issues into a second chamber, and wherein the second chamber is connected to the remaining regions of the baffle via an overflow.

6. The feed unit according to claim 1, wherein the chamber, is led radially outward to the tubular portion by two walls of the baseplate which lie one above the other in parallel.

7. The feed unit according to claim 1, wherein a receptacle for a pump holder has a sleeve-shaped configuration and faces the tubular portion.

8. The feed unit according to claim 1, wherein the propellant connection and/or the receptacle for the pump holder project/projects vertically from the baseplate.

9. The feed unit according to claim 1, wherein the tubular portion has a supporting wall arranged parallel to the plane of the baseplate.

10. The feed unit according to claim 1, wherein the supporting wall has means for holding the fuel pump and/or a fine filter.

11. The feed unit according to claim 1, wherein the pump holder has a plurality of supporting bars projecting from the supporting wall.

12. The feed unit according to claim 1, wherein the supporting wall has a connection piece for the propellant connection.

13. The feed unit according to claim 1, wherein the baseplate has a receptacle for the fine filter.

14. The feed unit according to claim 1, wherein the baseplate has a first-filling orifice with a nonreturn valve and, upstream of the first-filling orifice, a depression, and wherein a suction connection piece of the fuel pump is led into the depression.

15. The feed unit according to claim 1, wherein the tubular portion and the baseplate are connected to one another via a press fit.

16. The feed unit according to claim 1, wherein the baseplate is welded to the tubular portion.

17. A method for conveying fuel out of a fuel tank of a motor vehicle, comprising the steps of:
   arranging a fuel pump in a baffle,
   providing a tubular portion of the baffle, said tubular portion at least partially receiving the fuel pump,
   providing a baseplate of the baffle, said baseplate closing off the tubular portion downward, and
   providing a suction jet pump for filling the baffle with fuel from the fuel tank, wherein the components of the suction jet pump are manufactured in one piece with the baseplate of the baffle, the baseplate and the tubular portion are designed as components to be manufactured independently of one another, and wherein the baseplate has a margin connected sealingly to the tubular portion of the baffle.

18. The method according to claim 17, wherein a set-up supporting margin of the baseplate supports the margin of the tubular portion.

19. The method according to claim 17, wherein a nozzle of the suction jet pump has a duct led as far as the supporting margin of the baseplate, the duct being closed at its end facing away from the nozzle, and wherein a propellant connection which faces the tubular portion is arranged between the nozzle and that end of said duct which faces away from the nozzle.

20. The method according to claim 17, wherein the baseplate and the tubular portion delimit a chamber arranged between the nozzle and a mixing tube, adjoining the nozzle, of the suction jet pump, and wherein a bottom valve is arranged in the baseplate and issues into the chamber.

* * * * *